US009735464B2

(12) United States Patent
Sabahialshoara et al.

(10) Patent No.: US 9,735,464 B2
(45) Date of Patent: Aug. 15, 2017

(54) SYSTEM AND METHOD FOR TRACKING

(71) Applicant: Sony Corporation, Tokyo (JP)

(72) Inventors: Meysam Sabahialshoara, Singapore (SG); Wei Beng Ng, Singapore (SG); Hisashi Masuda, Singapore (SG)

(73) Assignee: SONY CORPORATION, Tokyo (JP)

( * ) Notice: Subject to any disclaimer, the term of this patent is extended or adjusted under 35 U.S.C. 154(b) by 131 days.

(21) Appl. No.: 14/068,434

(22) Filed: Oct. 31, 2013

(65) Prior Publication Data

US 2014/0125459 A1 May 8, 2014

(30) Foreign Application Priority Data

Nov. 2, 2012 (SG) .............................. 201208202-0

(51) Int. Cl.
| | |
|---|---|
| H04Q 5/22 | (2006.01) |
| H01Q 1/24 | (2006.01) |
| G01S 13/75 | (2006.01) |
| G06K 7/10 | (2006.01) |
| H01Q 1/22 | (2006.01) |
| H01Q 3/26 | (2006.01) |
| H01Q 9/24 | (2006.01) |
| H01Q 9/28 | (2006.01) |
| H01Q 23/00 | (2006.01) |
| H01Q 5/40 | (2015.01) |
| G01S 13/76 | (2006.01) |
| G01S 13/02 | (2006.01) |

(52) U.S. Cl.
CPC .......... *H01Q 1/248* (2013.01); *G01S 13/751* (2013.01); *G06K 7/10099* (2013.01); *H01Q 1/2216* (2013.01); *H01Q 1/2225* (2013.01); *H01Q 3/26* (2013.01); *H01Q 5/40* (2015.01); *H01Q 9/24* (2013.01); *H01Q 9/285* (2013.01); *H01Q 23/00* (2013.01); *G01S 13/758* (2013.01); *G01S 13/765* (2013.01); *G01S 2013/0245* (2013.01)

(58) Field of Classification Search
CPC .................................................. G06K 7/10366
USPC ........................................................ 340/10.1
See application file for complete search history.

(56) References Cited

U.S. PATENT DOCUMENTS

| | | | |
|---|---|---|---|
| 4,598,275 A * | 7/1986 | Ross ................... | G06K 7/0008 340/5.61 |
| 8,159,364 B2 * | 4/2012 | Zeine ........................ | 340/693.1 |
| 2005/0110636 A1 * | 5/2005 | Ghaffari ................... | 340/539.27 |
| 2008/0014897 A1 * | 1/2008 | Cook et al. ............... | 455/343.1 |
| 2009/0058730 A1 * | 3/2009 | Geissler ............... | A01K 11/004 342/450 |
| 2010/0188211 A1 * | 7/2010 | Brommer et al. ....... | 340/539.32 |

FOREIGN PATENT DOCUMENTS

JP         2012-064988         3/2012

* cited by examiner

*Primary Examiner* — Omeed Alizada
(74) *Attorney, Agent, or Firm* — Chip Law Group

(57) ABSTRACT

A tracking system comprising: a transmitter configured to steer an RF beam across a detection range, a passive RFID tag configured to be enabled for locating substantially when located in the center of the RF beam of the transmitter, and an RFID reader configured to detect the tag 104 once enable.

11 Claims, 5 Drawing Sheets

Figure 3a
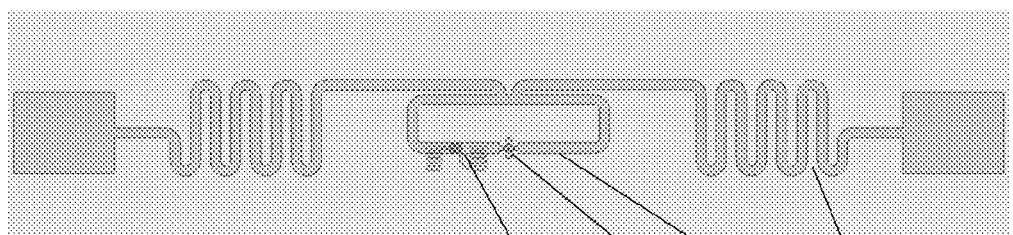
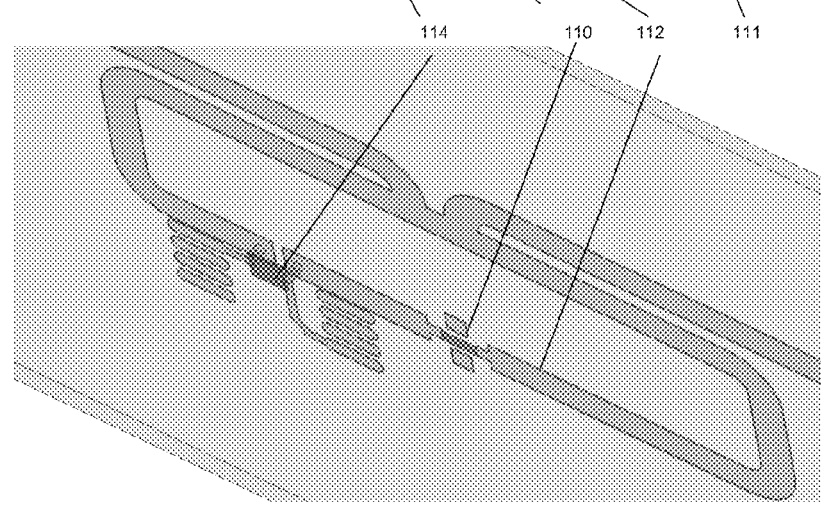
Figure 3b

SYSTEM AND METHOD FOR TRACKING

RELATED APPLICATION DATA

The present application claims the benefit of priority to Singapore Patent Application No. SG 2012-08202-0 filed on Nov. 2, 2012 in the Singapore Patent Office, the entirety of which is incorporated by reference herein to the extent permitted by law.

BACKGROUND

The present invention relates to a system and method for tracking.

In modern wireless communication, power efficiency is an important design consideration. To achieve higher power efficiency, directional or focused RF beams, (instead of omni-directional beams), are increasingly being employed. However, transmission by directional beam forming either requires a fixed spatial relationship or real-time information on the relative position of the two communicating devices.

One method to detect relative position is to send an acknowledgement signal from a receiver to a transmitter either at the same frequency or at a second frequency. This acknowledgement signal may sometimes include position information. However, this method requires that the receiver to be active and generate the acknowledgement signal using a battery or a super capacitor that stores previously received power. Moreover, to build such a system, peripheral blocks like VCOs, power meters and control circuitries may be required at the receiver and transmitter. It should be noted that all of these blocks are active and will consume power. Also complexity and synchronization of the receiver and transmitter may be problematic.

SUMMARY OF THE INVENTION

In general terms the invention provides a passive receiver which does not need to generate an acknowledgement signal. A modified RFID tag and an RFID reader are used to detect the position of the receiver.

One or more embodiments may have the advantage(s) of:
1. Transmitting RF energy to a single or multiple directions rather than omni-directionally or the front-side;
2. Wirelessly charging low power electronics which consumes less than a dozen milliwatts, avoiding unnecessary user exposure;
3. Detecting the location of a rectifying antenna; and/or
4. Tracking the receiving antenna when the rectifying antenna is in motion.

In an embodiment, there is provided a tracking system comprising: a transmitter configured to steer an RF beam across a detection range, a passive RFID tag configured to be enabled when the tag and/or an RF antenna is located substantially in the RF beam, and an RFID reader configured to detect the tag once enabled.

In an embodiment, the tag is configured to connect to the RF antenna and to toggle a switch to enable the tag when the RF antenna is located substantially in the RF beam.

In an embodiment, the antenna is a rectenna.

In an embodiment, the RF beam is at a first frequency in an ISM band substantially located about 2.45 GHz or 5.80 GHz.

In an embodiment, the RFID reader is configured to detect the tag using a second frequency in an RFID band substantially located about 866-869 MHz, 928-950 MHz or 2.4-2.5 GHz.

In an embodiment, the transmitter comprises a steerable phased array antenna for the RF beam and/or for the RFID reader to detect the tag.

In an embodiment, the antenna is a rectenna and the rectenna is omni-directional or directive.

In an embodiment, the RF beam is sequentially steered at a series of spaced discrete angles, and if the RFID tag is detected, a tag location is determined as one of the discrete angles.

In an embodiment, the RF beam is continuously steered across the detection range, and if the RFID tag is detected, a tag location is determined as the centre of the range of RF beam steering angles where the RFID tag was detected, or as the angle at which a RSSI is the highest.

In an embodiment there is provided a method comprising: scanning a beam of RF radiation over a plurality of sectors; switching a modified RFID tag from invisible to visible when the tag receives the RF beam is in the currently scanned sector; detecting visible RFID tags; and determining the location of the tag of locating a tag relative to the RF beam origin based on the current sector in which an RFID tag can be detected.

In an embodiment the method further comprises focusing power RF radiation at the determined location.

In an embodiment, the method further comprises tracking any change in the determined location.

BRIEF DESCRIPTION OF THE DRAWINGS

One or more example embodiments of the invention will now be described, with reference to the following figures, in which:

FIGS. 3*a* and 3*b* show the integration of an RF switch with the RFID tag.

DETAILED DESCRIPTION

A tracking system uses transmitter with a steerable phased array antenna and an RFID reader, to locate a RFID tag. The Phased array antenna scans different angular sectors and sends power toward those specific sectors during the scanning time. The RFID tag includes a rectenna that receives RF power from phased array antenna and converts it to DC power. If the tag is in the active sector, the rectenna receives the RF power and produces a DC voltage. This voltage switches the RFID tag from being invisible to visible. The RFID reader is constantly scanning for visible tags and logs the current sector when a tag is detected as the tag location.

Sector here is used to mean a discrete angle range, or in terms of beam steering, a sequential series of spaced discrete beam steering angles. For example if detection range is ±80°, and there were 8 sectors, then the beam steering angles for each sector might be −70, −50, −30, −10, 10, 30, 50, 70.

Figure 1:
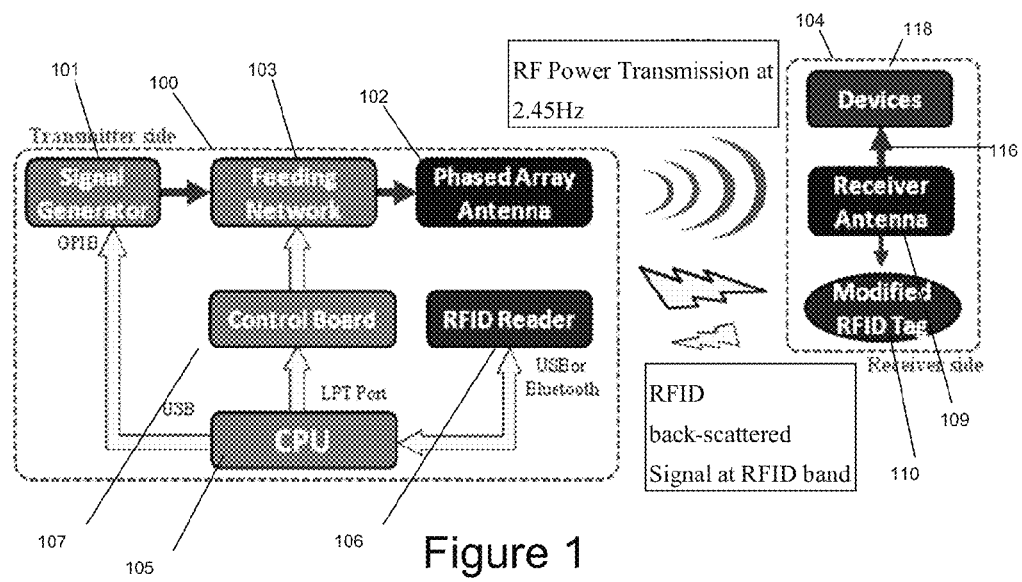
FIG. 1 is a block diagram of the overall RF based wireless energy transfer system with receiver searching and tracking functions.

A transmitter 100 is shown in FIG. 1. A phased array with M×N elements 102 transmits RF energy at a first frequency such as an ISM band for example: 2.45 GHz or 5.8 GHz. The signal for the array 102 is generated by signal generator/RF power generator 101 and coupled to each array element via feeding network 103.

A RFID reader 106 transmits at a second frequency such as an RFID band for example: 866-869 MHz or 928-950-MHz or 2.4-2.5 GHz. A CPU 105 communicates with to the RFID reader 106 and signal generator 101. The CPU 105 is also connected to a control board 107, which in turn connects to the feeding network 103.

The CPU 105 determines the power level to be transmitted by controlling the signal generator 101. The signal sent during scanning may differ in power, frequency etc. compared to the power signal sent once the RFID tag is located. The CPU 105 determines the sector or direction of the array 102 by controlling the feeding network 103. The RFID reader 106 is enabled by the CPU 105 and provides a status signal back to the CPU 105 when a RFID tag is located. The scanning process (and thus power consumption by the RFID reader 106) may be continuous, periodic or may be event activated.

The RFID reader 106 may incorporate a separate antenna or may share the phased array antenna 102 if the first and second frequencies are similar or identical.

The RFID reader 106 may be off the shelf and retrofitted into the system. The RFID tag 104 may include a dipole antenna 111 including an inductive loop 112, and an RFID chip 110 coupled to antenna 111 via the inductive loop 112. The RFID tag 104 may be specifically modified as shown in FIGS. 2, 3a and 3b, depending on the application.

Figure 2:
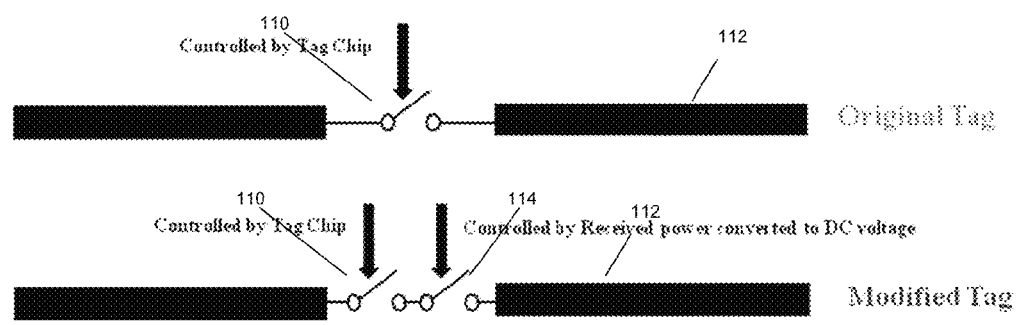
FIG. 2 is a schematic diagram of the modified RFID tag.
Figure 4:
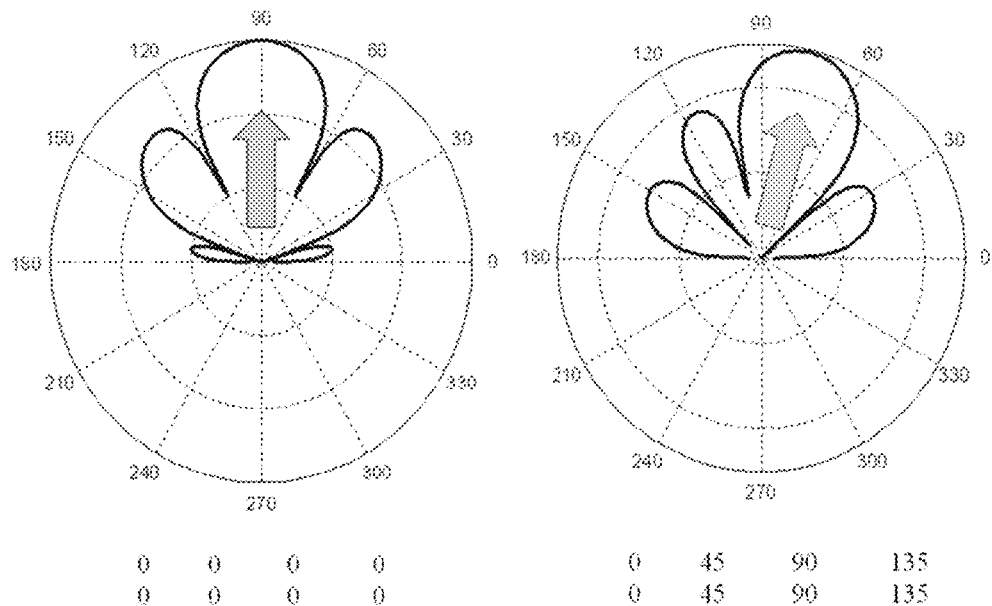
FIG. 4 is radiation pattern of the transmitter in two different states, using a 2×4 array antenna.

FIG. 2 shows the operation of an unmodified RFID chip; which uses a semi-switching method (modulation) to communicate with RFID reader 106. FIG. 2 also shows a modified RFID tag 104, with an added RF switch 114 in series with an RFID chip 110.

Figure 7:
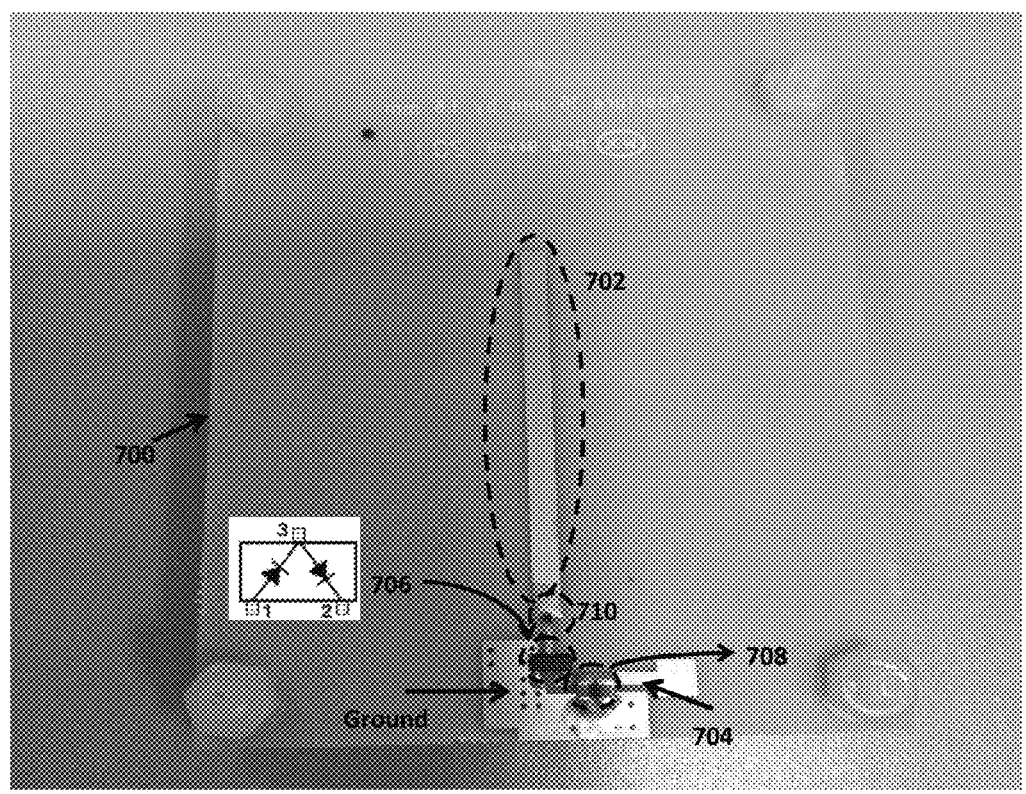
FIG. 7 is a photo of a rectenna.

A directional rectenna 109 designed for the second frequency converts any received RF energy from the array 102 and rectifies it into a DC bus 116. The rectenna 109 is shown in more detail in FIG. 7. The rectenna includes a patch radiator 700 fed by an antenna feed 702 and a DC bus 704. A voltage doubler 706 is connected between the antenna feed 702 and the DC bus 704 to rectify the signal from the antenna feed 702 to a DC voltage. Two capacitors 708 are provided to store energy received by the patch radiator 700 and to reduce the ripple on the DC bus 704. An inductor 710 is connected between the voltage doubler 706 and the antenna feed 702 for impedance matching.

The DC bus 116 is connected to the control input of the RF switch 114. As shown in FIG. 2 when the RF switch 114 is closed the loop 112 is closed and enabled, and when is open the loop 112 is open and disabled. When the inductive loop 112 is open, the coupling from the RFID chip 110 to the dipole 111 is insignificant and thus the RFID tag 104 appears invisible to the RFID reader 106. Alternatively if the RFID chip 110 may have an enable or disable input port to which DC bus 116 can be connected. In that case the RFID chip 110 itself is directly disabled rather than indirectly via the RF switch 114.

The modified RFID tag 104 can only be read once the transmitter is transmitting the RF beam toward its corresponding sector. So, the system can detect that a rectenna is located in this sector and the system can either stop at this step or it can continue to find other rectennas in other sectors. After detecting the sector(s) of the available rectenna(s) the system can transmit power toward the detected sector(s).

The DC bus 116 is coupled to the mobile device(s) 118 as shown in FIG. 1. The mobile device(s) 118 or DC bus 116 may incorporate energy storage such a battery or super capacitor to store the received energy from the rectenna 109.

Each RFID chip 110 has its unique ID and this data is stored as the ID of the attached modified RFID tag by CPU 105.

The advantages of using different first and second frequencies are:

1. The TX is sending watt level power. If a single frequency or slightly shifted frequency is used, the TX power may jam detections.

2. Conventional RFID does not support beam steering. In this technology, one frequency is used for beam steering while another frequency at RFID band is used for detection. However, since the detection process and power transmission process are separate from each other, the same frequency for both of these processes can be used.

The system will operate in at least two modes:

1. Searching for Receivers

The TX scans and stores the ID of the read modified tags along with their corresponding sectors. It then can decide that to which of these sectors should transmit power.

2. Power Transmission and Tracking of Receivers

In the course of transmitting power to a rectenna, in some specified intervals the RFID reader tries to read the RFID tag of this rectenna again. If the RFID reader was able to read the modified tag again, TX will continue transmitting power to this rectenna. If not, it means that the rectenna has changed its sector and the system will start searching for the new sector of this rectenna.

Figure 5:
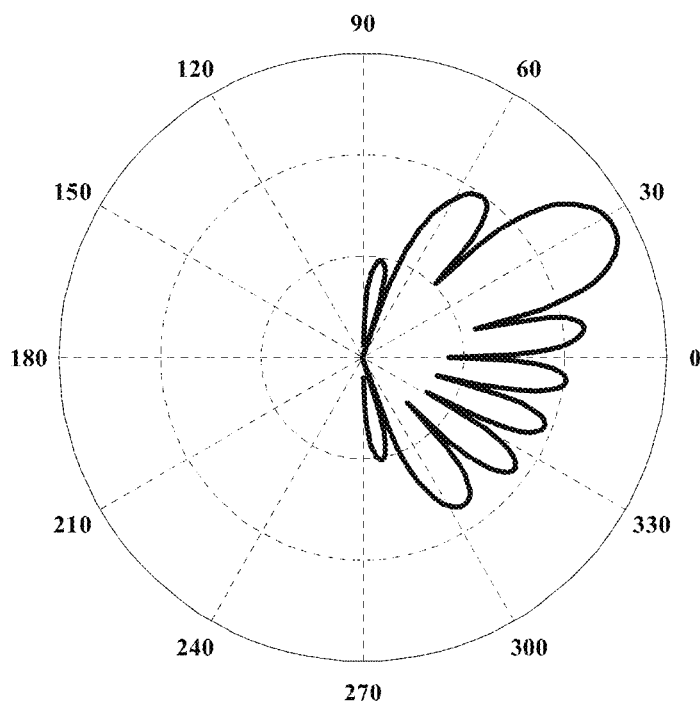
FIG. 5 is radiation pattern of the transmitter transmitting at +30 degrees, using an 8 element linear array antenna.
Figure 6:
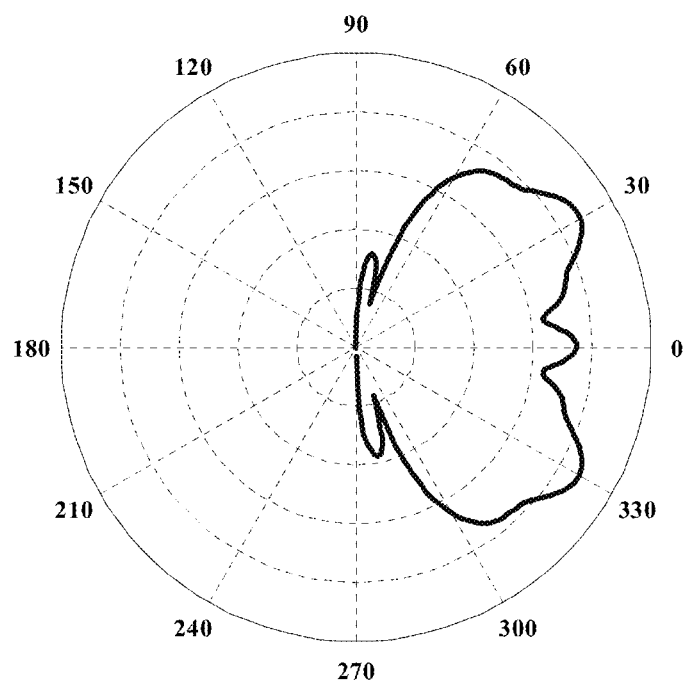
FIG. 6 is radiation pattern of the transmitter split into 2 sub-arrays delivering power to +30 and −30 degrees, using an 8 element linear array antenna.

The array 102 may deliver power to a single direction. However, it is also possible to configure the feeding network 103 to send multi-beams (>1). With an 8 element linear array, the radiation pattern of transmitting at +30 degrees is plotted in FIG. 5. The feeding network 103 can alternatively split the 8 elements into 2 sub-arrays, each consisting of 4 elements. Radiation pattern of two sub-arrays delivering power to +30 and −30 degrees are plotted in FIG. 6. The penalty of doing this may be wider beam width, since fewer elements are used, and reduced power by a factor of 2.

Moreover, its also possible to steer the beam continuously. As the beam is steered across its complete arc, the RFID reader 106 will continue to monitor for responses by a RFID tag 104. In this scenario the RFID tag 104 may become enabled or detected over a region of beam steering angles, rather than a discrete beam steering angle as described above. The CPU 105 can determine the RFID tag 104 location by either: 1) monitor the start and end angle of the detected region and designate the centre of this region or) determine the beam steering angle at which the RSSI (Received Signal Strength Indication) of the reflected RFID tag signal is highest.

While example embodiments of the invention have been described in detail, many variations are possible within the scope of the invention as claimed as will be clear to a skilled reader.

What is claimed is:

1. A tracking system, comprising:
a transmitter configured to steer a radio frequency (RF) beam at a first frequency across a detection range;
a radio frequency identification (RFID) tag configured to be switched from a non-readable state into a readable state based on the RFID tag that is located in the RF beam, wherein the RFID tag comprises a switch that selectively connects an RFID chip, that has a unique identifier, to an inductive loop; and an RFID reader configured to transmit a power signal at a second frequency to detect a location of the RFID tag based on the RFID tag that is switched into the readable state, wherein the RF beam is configured to sequentially steer at a series of spaced discrete angles.

2. The tracking system of claim 1, wherein the RFID tag is further configured to:

connect to an RF antenna, and toggle the switch such that the RFID tag is switched from the non-readable state into the readable state based on the location of the RF antenna in the RF beam.

3. The tracking system of claim 2, wherein the RF antenna is a rectenna.

4. The tracking system of claim 1, wherein the RF beam is at the first frequency in an ISM band of about 2.45 GHz or 5.80 GHz.

5. The tracking system of claim 1, wherein the RFID reader is further configured to detect the location of the RFID tag based on the second frequency in an RFID band of about 866-869 MHz, 928-950 MHz, or 2.4-2.5 GHz.

6. The tracking system of claim 1, wherein the transmitter comprises a steerable phased array antenna for the RF beam or for the RFID reader to detect the location of the RFID tag.

7. The tracking system of claim 3, wherein the rectenna is one of omni-directional or directive.

8. The tracking system of claim 1, wherein based on the detection of the location of the RFID tag, the RFID tag location is determined as one of the spaced discrete angles.

9. A tracking method, comprising:

scanning a radio frequency (RF) beam at a first frequency over a plurality of sectors;

switching a radio frequency identification (RFID) tag from a non-readable state into a readable state by use of a switch in the RFID tag based on a location of the RFID tag in the RF beam, the switch selectively connecting an RFID chip, having a unique identifier, to an inductive loop; and transmitting a power signal at a second frequency by an RFID reader to detect the location of the RFID tag that is in the readable state, wherein the location of the RFID tag that is switched from the non-readable state into the readable state is detected relative to an origin of the RF beam based on a sector, of the plurality of sectors, in which the RFID tag is detected, and wherein the RF beam is configured to sequentially steer at a series of spaced discrete angles.

10. The tracking method of claim 9, further comprising focusing power of RF beam at the detected location.

11. The tracking method of claim 10, further comprising tracking a change in the detected location.

* * * * *